P. P. ANDREWS.
CHICKEN CATCHER.
APPLICATION FILED APR. 12, 1913.
1,084,524.
Patented Jan. 13, 1914.
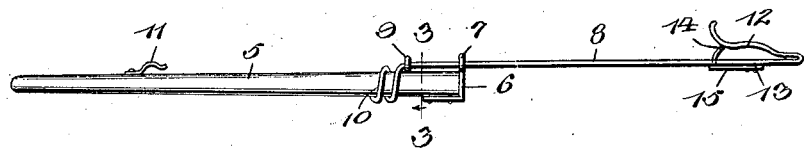
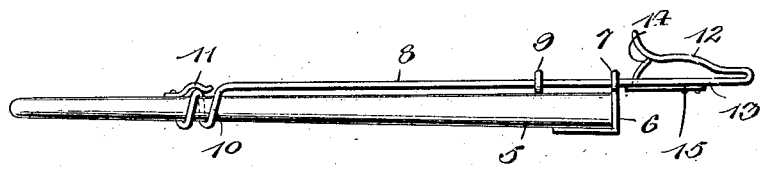
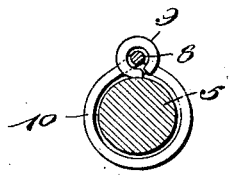
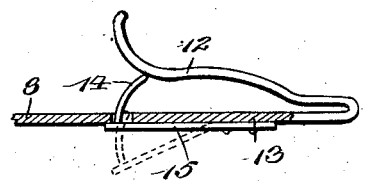
Inventor
P. P. Andrews
Witnesses
By Victor J. Evans
Attorney

UNITED STATES PATENT OFFICE.

PATRICK P. ANDREWS, OF NORFOLK, VIRGINIA.

CHICKEN-CATCHER.

1,084,524.  Specification of Letters Patent.  Patented Jan. 13, 1914.

Application filed April 12, 1913. Serial No. 760,695.

*To all whom it may concern:*

Be it known that I, PATRICK P. ANDREWS, a citizen of the United States, residing at Norfolk, in the county of Norfolk and State of Virginia, have invented new and useful Improvements in Chicken-Catchers, of which the following is a specification.

The invention relates to a chicken or other fowl catching device, and has for its primary object to provide a device of this character wherein the leg of a chicken or fowl can be caught and held so that a person can handle the chicken or fowl after being caught or catch the fowl without the necessity of shooting or chasing the same when free.

Another object of the invention is the provision of a device of this character in which the hook for engaging the leg of the chicken is of novel form so that the leg of a chicken can be gripped when the same is free, the hook being designed to prevent the release of the leg of the chicken, thus permitting the secure holding of the same without possibility of the release thereof after being caught.

A further object of the invention is the provision of a device of this character which is extremely simple in construction, capable of extension or contraction, reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a side elevation of a device constructed in accordance with the invention, the same being shown extended. Fig. 2 is a similar view showing the device contracted. Fig. 3 is a sectional view on the line 3—3 of Fig. 1. Fig. 4 is a vertical longitudinal sectional view through the hook end of the device, the same being on a large scale.

Similar reference characters indicate corresponding parts throughout the several views in the drawing.

Referring to the drawing by numerals, the device comprises a handle 5 which may be of any desirable length and is preferably of circular formation in cross section, the same gradually tapering from one end to the other. The handle is made from wood, although it may be made from any other material having the requisite strength.

Fixed to the larger end of the handle 5 is a member 6, one end of which projects beyond one side of the said handle and is formed with an eye 7 through which is passed a slidable rod 8, the same being also passed through a secondary eye member 9 suitably fixed to the handle in alinement with the eye 7, the inner end of the rod 8 being convoluted to form a double coil 10 which loosely embraces the handle 5, and when this rod 8 is moved inwardly the inner end 10 is designed to engage in a spring clip 11 suitably mounted upon the handle 5 so as to hold the said rod, thereby permitting the device to be conveniently carried from one point to another, yet when the device is to be used the rod 8 is moved outwardly.

Formed at the outer end of the rod 8 is a main hook comprising a main arm 12 which merges into the short arm 13 integral with or fixed to the said outer end of the rod 8, the arms being arranged angularly with relation to each other to form an entrance space therebetween, and this space is normally closed by means of a supplemental hook or catch 14 mounted upon a resilient spring 15 at the free end thereof, the opposite end of the said spring being suitably fixed to the short arm 13 of the hook, the secondary hook 14 being curved in the direction of the elbow of the main hook so that when the device is manipulated and pressure is applied to the supplemental hook 14 the latter will be displaced against the resistance of the spring 15, thus permitting the leg of the fowl to pass into the space between the arms of the main hook 12 and 13 and thereafter the spring 15 will move the supplemental hook or latch 14 into closing relation with respect to the main hook, thus firmly gripping the leg of the fowl for holding the same.

It will be seen that if a small fowl is caught the leg will pass well down into the space between the arms of the main hook which is substantially V-shaped, while in attaching the device to a larger fowl the leg will be caught by the supplemental hook or latch 14. In either event the operation of the device is the same. It will be impossible for the fowl to release its leg from the main hook after it is caught thereby so that the fowl can be quickly and easily caught without unnecessary chasing thereof or being shot as usual when free.

From the foregoing it is thought that the construction and manner of operation of the device will be clearly understood, and therefore a more extended explanation has been omitted.

What is claimed is:—

The combination with a handle, a substantially L-shaped bracket fixed to one end of the handle and having an eye projecting outwardly beyond one side of the handle, a rod slidable through the said eye and having a convoluted inner end loosely embracing the said handle, a resilient clip fixed to the handle between its ends and engageable with one of the convolutions to hold the rod in adjusted position, a rearwardly divergent hook terminal formed on the outer end of the rod, and a spring-held latch working through the rod and adapted to normally close the hook terminal, the said latch being forwardly curved.

In testimony whereof I affix my signature in presence of two witnesses.

PATRICK P. ANDREWS.

Witnesses:
C. M. SPEESE,
J. A. TURK.